United States Patent [19]
Azema

[11] Patent Number: 6,012,884
[45] Date of Patent: Jan. 11, 2000

[54] LOGICAL DESIGN OF A SPINDLE HOLDERTYPE MACHINE TOOL FOR HIGH-SPEED MACHINING

[75] Inventor: Andre Azema, Saix, France

[73] Assignee: Renault-Automation, Bouloqne-Billancourt, France

[21] Appl. No.: 09/101,769
[22] PCT Filed: Jan. 22, 1997
[86] PCT No.: PCT/FR97/00124
§ 371 Date: Nov. 3, 1998
§ 102(e) Date: Nov. 3, 1998
[87] PCT Pub. No.: WO97/27026
PCT Pub. Date: Jul. 31, 1997

[30] Foreign Application Priority Data

Jan. 23, 1996 [FR] France .................................. 96 00912

[51] Int. Cl.[7] .................................................. B23Q 1/62
[52] U.S. Cl. .......................... 409/191; 408/234; 409/235
[58] Field of Search ..................... 408/88, 234; 409/134, 409/185, 190, 191, 235

[56] References Cited

U.S. PATENT DOCUMENTS

| | | | |
|---|---|---|---|
| 4,742,609 | 5/1988 | Neumann | 409/235 |
| 5,314,397 | 5/1994 | Mills et al. | 408/234 |
| 5,316,420 | 5/1994 | Watanabe et al. | 409/235 |
| 5,346,345 | 9/1994 | Jerzycke et al. | 408/234 |
| 5,368,425 | 11/1994 | Mills et al. | 409/191 |
| 5,401,128 | 3/1995 | Lindem et al. | 409/235 |
| 5,662,568 | 9/1997 | Limdem | 408/234 |
| 5,688,084 | 11/1997 | Fritz et al. | 408/234 |

FOREIGN PATENT DOCUMENTS

| | | | |
|---|---|---|---|
| 209840 | 9/1986 | Japan | 409/235 |

*Primary Examiner*—Daniel W. Howell
*Attorney, Agent, or Firm*—Oblon, Spivak, McClelland, Maier & Neustadt, P.C.

[57] ABSTRACT

A logical structure of a frame of a machine tool enables displacements of a movable mechanism, such as a slide, along three axes X, Y, and Z. A first pair of parallel transverse horizontal guide rails is disposed in a vertical plane and enables horizontal displacements of the slide along the X axis. A second pair of parallel lateral vertical guide rails is disposed in the same vertical plane and enables vertical displacements of the slide along the Y axis which is perpendicular to the X axis. A third pair of parallel longitudinal horizontal guide rails is disposed in a horizontal plane and enables horizontal displacements of the slide along the Z axis which is perpendicular to both the X and Y axes. A front portion of the slide is unencumbered by drive mechanisms and passes through a telescopic cowling which follows movements of the slide and separates a drive station from a machining station.

9 Claims, 4 Drawing Sheets

LOGICAL DESIGN OF A SPINDLE HOLDERTYPE MACHINE TOOL FOR HIGH-SPEED MACHINING

BACKGROUND OF THE INVENTION

1. Field of the Invention

The present invention relates to the field of machine tools and more particularly to modifications with which high-speed displacements along three axes X, Y and Z of a slide carrying the movable machining tool can be achieved under the best conditions.

2. Description of the Related Art

High-speed machining of parts in a machine tool generally takes place using rotary tools installed at the end of a slide, which itself is mounted to be movable along three axes, two of which X, Y are disposed in a plane P(x,y) parallel to the plane of machining of the parts and the third Z is disposed in a plane P(x,z) perpendicular to the same plane of machining of the parts.

To facilitate reading of the description to follow, the plane of machining of parts will be assumed to be vertical, as is the case in the majority of embodiments of machine tools of this type in the field of high-speed machining, and so the plane P(x,y) of the first two axes X and Y is considered to be vertical and the plane P(x,z) of the third axis Z is considered to be horizontal.

A machine tool for high-speed machining is generally provided with three main working stations, to wit:

a machining station proper, provided with the tool driven rotationally at the end of the slide and shaping the part to be machined, a drive station situated after the machining station and comprising an assembly of mechanisms that ensure in particular the X, Y and Z displacements of the slide, which also ensures the rotary movement of the tool carried at the end, and a control station cooperating with the drive station as a function of a program of instructions preestablished to organize and take charge of the different phases of machining of the part.

In such machine tools, the logical structure of the machine is built substantially around the drive station and in particular as a function of the arrangement of rails guiding the reciprocating rectilinear displacements of the slide along the three axes X, Y and Z. The traditional design of the frame of such a machine comprises disposing:

two parallel guide rails in the horizontal plane P(x,z) to enable the transverse horizontal displacements of the slide along the X axis, two parallel guide rails in the vertical plane P(x,y) to enable the vertical displacements of the slide along the Y axis and perpendicular to the X axis, two parallel guide rails in the horizontal plane P(x,z), perpendicular to the rails for transverse horizontal displacements along the X axis, to enable the horizontal longitudinal displacements of the slide along the Z axis, perpendicular to the X and Y axes.

Within the context of the invention, the transverse and longitudinal displacements X and Z respectively of the slide are understood as being relative to the longitudinal axis of the machine, along which there are aligned the three working stations.

Although such an arrangement is not currently the subject of any development in the field of machine tools, this nondevelopment is because translational movements of the movable mechanisms are generally driven by rotating electric motors cooperating with belts and gears to convert the rotary movements into linear movements. In addition, since the problem of a floor space requirement of machine tools is not the main concern of the manufacturers, this triaxial logical arrangement has never been questioned, because it offers more convenient seating of the frame on the floor, especially when the mechanisms making up the machine tool, such as tool cassettes, motors, etc. are cumbersome and heavy.

A new machine concept has been to provide machines in which the two horizontal rails enabling the displacements (arrow X) along the X axis are disposed in parallel and one above the other in the plane P(x,y). The machine tools described in European Patent No. 0614724 and in German Patent No. 3704952 provide such a logical structure in which:

two transverse guide rails disposed in parallel in the vertical plane P(x,y) enable the transverse horizontal displacements (arrow X) of the slide along the X axis, and two lateral guide rails disposed in parallel in the same vertical plane P(x,y), enable the vertical displacements (arrow Y) of the slide along the Y axis, perpendicular to the X axis. The two structures differ in that the structure described by the European Patent is not provided with rails or slide blocks permitting it to move its tool perpendicular to the plane P(x,y), or in other words along the Z axis. Instead, the part holder is provided with a kinematic linkage permitting it to move to and fro perpendicular to the plane of movement of the slide.

The structure proposed by German Patent No. 3704952 proposes a tool movement along the Z axis, but in a manner that, for several reasons, is particularly inadequate for high-speed machining. On the one hand, the tool is located at the end of an arm which is telescopic in the Z axis and which, although easy to employ as a means used for a particularly large machining travel in the case of a normal tool and drive, is much more difficult to apply for the movement of a tool-carrying electric spindle because of its weight (and consequently of the overhang), of the hydraulic and electric connections for tracking its movements and of the much shorter travels required of it. On the other hand, this telescopic arm enables movement in the Z direction and occupies space of the logical structure only on a single half plane or half Z axis, which has the consequence of increasing the volume of a machine that uses such a structure.

Another difference existing between the two cited logical structures lies in the fact that the structure proposed by European Patent No. 0614724 adopts linear motors as drive means in order to ensure displacements of the slide along the two axes X and Y and of the part holder along the Z axis. Such motors are particularly suitable for achieving the rapid and precise movements required by modern machining. Nevertheless, the slide of the logical structure of that patent is fixed relative to the Z axis, and it is the part-holder module which, by means of linear motors, is displaced or becomes distant from the slide and its tool. The absence of movement along the Z axis is a particularly serious limitation for such a machine.

Another machine design described in U.S. Pat. No. 4,752,160 uses three pairs of rails disposed perpendicular to each other in order to enable displacement of the tool along the two axes X and Y, from one working station to another aligned along the X axis, one on each side of a control station.

The displacement of the tool is enabled according to the embodiment, which is illustrated in two ways. On the one hand, the logical structure carrying the tool and enabling its displacement along the Y axis is displaced on a central portion of rails situated opposite the control station and mounted to be detachable relative to the remaining lengths in order to displace the tool toward the control station along the Z axis, but only on this portion of detachable length of the X axis. On the other hand, the tool carriage is displaced along the Z axis by slide blocks, on which it slides, driven by a ballscrew device moved by a motor connected to the slide.

Although this patent proposes a kinematic structure enabling displacement of the tool on three axes, it exhibits several disadvantages, such as:

The logical structure ensures guidance on four slide blocks for movement along the Y axis and Z axis, and these four slide blocks require that the logical structure adopts for these very two movements an orthogonal geometry, which makes the structure heavy and increases its volume. The choice of a device of the ballscrew type as means of movement in fact necessitates the presence of a large number of guides to avoid jamming and to gain in precision.

This choice of actuators has the disadvantage not only that the logical structure is necessarily heavier but also that it cannot meet the needs inherent to high-speed machining. Thus, the movements between the different machining steps (tool-changing or tool-placing movements) must be ultra-fast, which is not possible with this logical structure because of its heavy weight. In addition, a drive of the ballscrew type does not always provide the precision required for modern machining operations.

SUMMARY OF THE INVENTION

The Applicant has undertaken research in view of studying a new concept for constructing the logical structure of the frame of a high-speed machine tool that uses classical concepts of mechanics in its construction, with specific criteria for adaptation to the installation of lightweight and high-speed mechanisms. By virtue of this fact, the present invention integrates original criteria which constitute for such a machine a design principle yielding novel advantages, among which is the adequacy of the machine for its particular purpose of high-speed machining by a preferred arrangement of rails for guiding the translational movements of the movable mechanisms along the three displacement axes X, Y and Z.

To meet the sought objectives of high-speed machining, there was therefore conceived a machine tool enabling displacements of a movable mechanism along three axes X, Y and Z, by adopting a particular logical structure which is remarkable in that the two longitudinal guide rails disposed in parallel in the horizontal plane P(x,z) and enabling the horizontal displacements of the movable mechanism along the Z axis are, on the one hand, situated one on each side of the vertical plane P(x,y) defined by the two axes X and Y, such that the center of gravity of the mechanism is as close as possible to the vertical plane P(x,y) of the displacements along the X and Y axes and, on the other hand, are mounted to be slidable along the Y axis between the two lateral vertical guide rails which, disposed in parallel in the same vertical plane P(x,y), are mounted to be slidable along the X axis between the two transverse horizontal guide rails disposed in parallel in the vertical plane P(x,y).

The new arrangement of these three pairs of guide rails along the three displacement axes X, Y and Z offers numerous other advantages, including:

an appreciable increase in rigidity of the logical structure, closer proximity of the movable masses to a vertical plane, much smaller floor space requirement, and an opportunity to make the structure of the support elements of the guide rails lighter.

In addition, the disposition of two longitudinal guide rails, parallel in the horizontal plane P(x,z) and enabling the longitudinal horizontal displacements of the slide along the Z axis situated one on each side of the vertical plane P(x,y) of the x and Y axes, makes it possible to have the center of gravity of the movable masses on the Z axis and as close as possible to the vertical plane P(x,y).

This logical structure of the invention makes it possible to conceive a new design of machine tool of the spindle-carrier type for high-speed machining. For this purpose, this machine tool comprises a frame provided with a support chassis that is open at its center and arranged in a vertical plane P(x,y) of a pair of parallel horizontal transverse rails that enable a vertical table that is open at its center and forms a support framework to slide between them and in a transverse horizontal movement along the X axis. This vertical table is bordered laterally by a pair of parallel vertical rails, which are disposed perpendicular to the first pair of transverse rails and on which there slides therebetween a headstock in a vertical movement along the Y axis. According to the principal characteristic of the invention, this headstock is bordered laterally by a third pair of longitudinal horizontal rails disposed one on each side of the vertical plane P(x,y) perpendicular to the first pair of transverse horizontal rails and to the second pair of parallel lateral vertical rails, in order to enable the spindle-carrier slide to slide (arrow Z) therebetween while straddling the plane P(x,y) in a horizontal movement (arrow Z) directed in the Z axis. By virtue of the special architecture of this machine, there is obtained a symmetric general configuration which permits in particular:

the access and/or unloading area to be disposed at the right or left of the machine, a plurality of machines to be coupled side-by-side, and a smaller floor space requirement on the order of 1600 mm wide to be achieved, thus enabling integration of the machine into a transfer unit with a spacing of 800 mm.

According to a preferred embodiment of the invention, the vertical table and the headstock enabling the support of the two pairs of rails for guidance along the two axes Y and Z are made of aluminum which, while establishing an extremely balanced ratio between lighter weight of the movable masses and rigidity of the overall movable structure, allows high accelerations of the movable masses to be achieved.

In addition, the special architecture of three pairs of rails guiding the movements of the mechanisms along the three axes X, Y and Z of the logical structure of this machine tool is particularly suitable for the adoption of linear motors instead and in place of rotating motors in order to activate the reciprocating rectilinear displacements of the movable mechanisms along the three axes X, Y and Z while permitting an extremely compact arrangement of guide rails and of the linear motors themeselves.

While also respecting the constraints of high-speed machining, another object of the invention is to limit as much as possible the expansion and contraction of materials due to temperature changes.

BRIEF DESCRIPTION OF THE DRAWINGS

Although the main aspects of the invention considered to be novel have been expressed hereinabove in their most elementary form, more ample details concerning a preferred embodiment of a machine tool of the spindle-carrier type for machining in conformity with the fundamental concepts of the invention will be better understood by referring to the description hereinafter and to the accompanying drawings illustrating the embodiment, wherein.

DETAILED DESCRIPTION OF THE INVENTION

Figure 1:
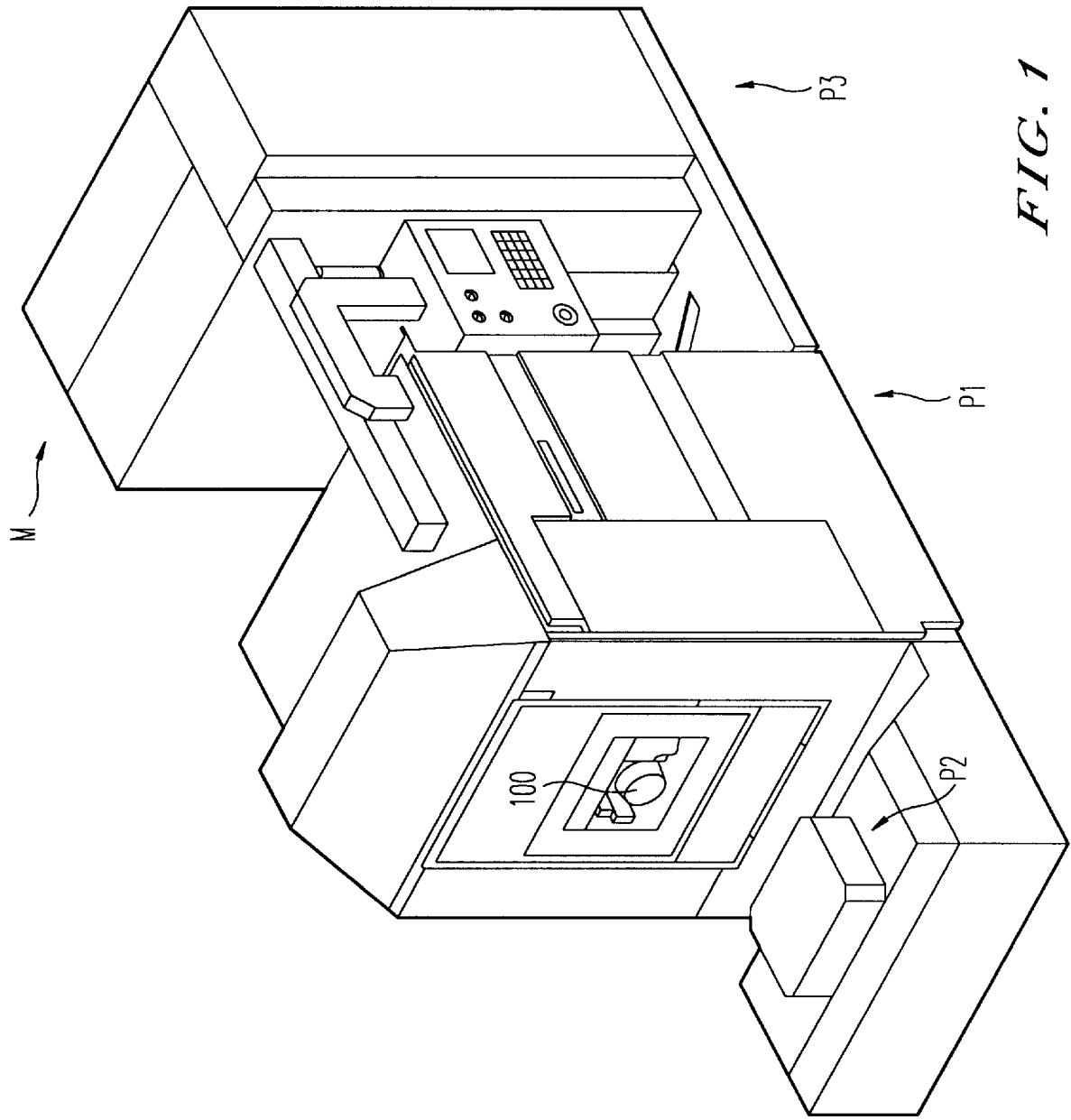
FIG. 1 is a perspective view of such a machine with the part to be machined disposed in a vertical plane.

As can be seen from FIG. 1, the drive station P1 of a machine tool M for high-speed machining, is situated between a machining station P2, provided with the tool driven in rotation to shape the part to be machined, and a control station P3 cooperating with the drive station P2 as a function of a program of instructions pre-established to organize and take charge of the different phases of machining of the part.

Figure 2:
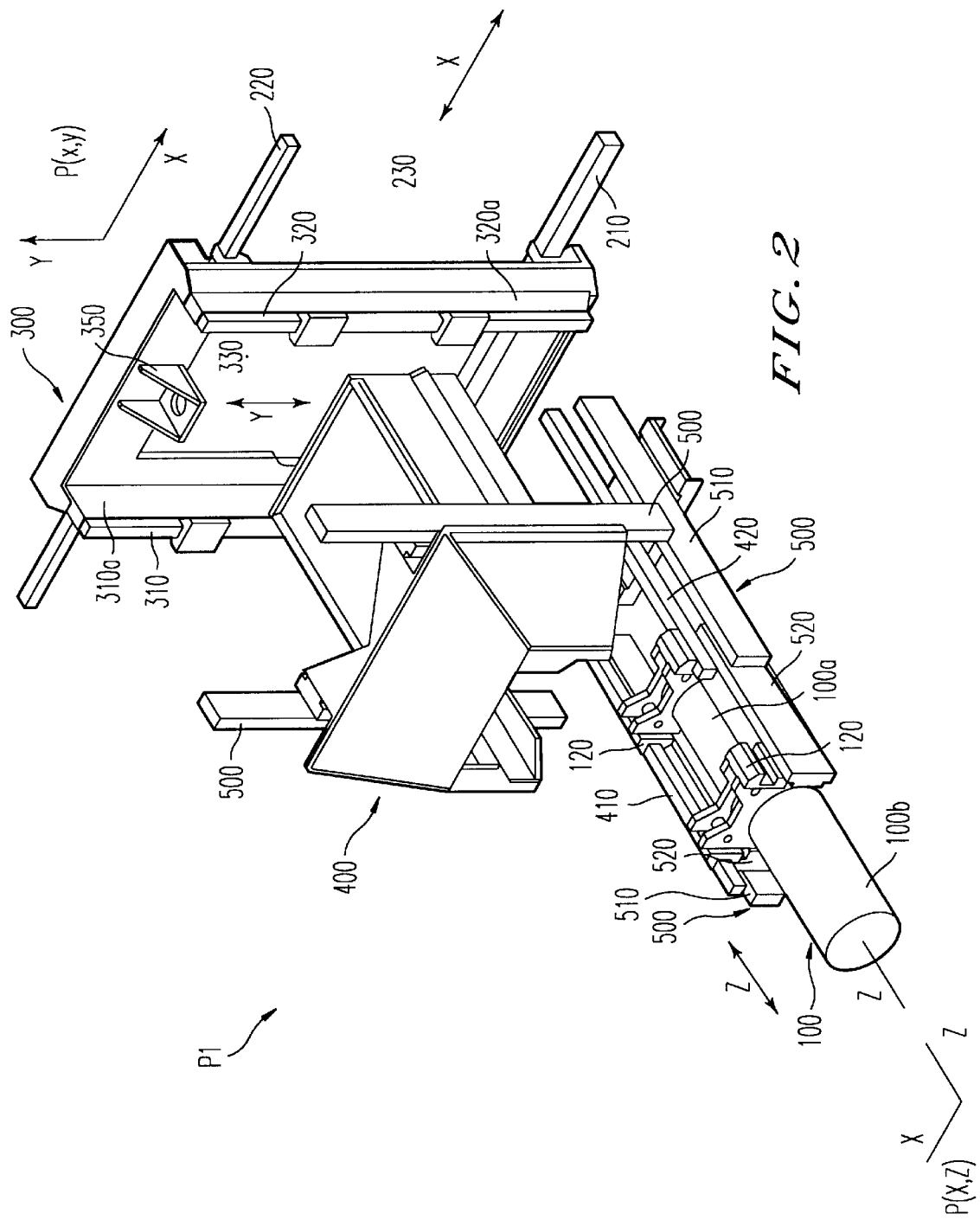
FIG. 2 is a partly exploded perspective view of the drive station of such a machine, with its casing removed.

The drive station P1 is represented in FIG. 2, from which the casing parts have been removed in order to better emphasize the logical structure of the different mechanisms necessary for operation thereof, and especially those ensuring the reciprocating alternating displacements (double-headed arrows X, Y and Z) of the slide 100, which ensures the rotational movement of the tool carried at the end.

According to the invention, the logical structure of this drive station P1 comprises a support chassis 200 (appearing partly in the drawing of FIG. 3) forming the frame of station P1. This support chassis or frame 200 is made of two transverse members 210a and 220a designed to support two parallel horizontal transverse rails 210 and 220 which define between them an opening 230 for passage through the frame. According to the fundamental concept of the invention, these two transverse rails 210 and 220 are aligned in a vertical plane P(x,y) to enable a vertical table 300 to slide (as symbolized by the double-headed arrow X) in a transverse horizontal movement directed in the X axis. The table, which forms a support framework, is bordered laterally in FIG. 2 by two lateral uprights 310a, 320a designed to support a pair of parallel lateral rails 310 and 320 while defining therebetween an opening 330 for passage through the support framework or table 300 and communication in FIG. 3 with the opening 230 of the frame 200. This pair of side rails 310 and 320 of the table 300 in FIG. 2 is disposed perpendicular to the first pair of transverse rails 210 and 220, in order to enable a movable headstock 400 to slide (as symbolized by the double-headed arrow Y) in a vertical movement directed in the Y axis. This headstock 400 can therefore perform two movements in the vertical plane P(x,y), one (arrow X) being imposed by the mobility of the vertical table 300 along the transverse rails 210 and 220 integral with the support chassis or frame 200 of FIG. 3 and the other (arrow Y) being imposed by the mobility of the headstock 400 along the lateral rails 310 and 320 associated with the table 300.

The headstock 400 is in addition traversed by the spindle-carrier slide 100, which slides (double-headed arrow Z) therein in a longitudinal horizontal movement directed in the Z axis, along two horizontal longitudinal rails 410 and 420, which are affixed to the inside of the headstock 400 and on which there is suspended the slide 100.

Figure 3:
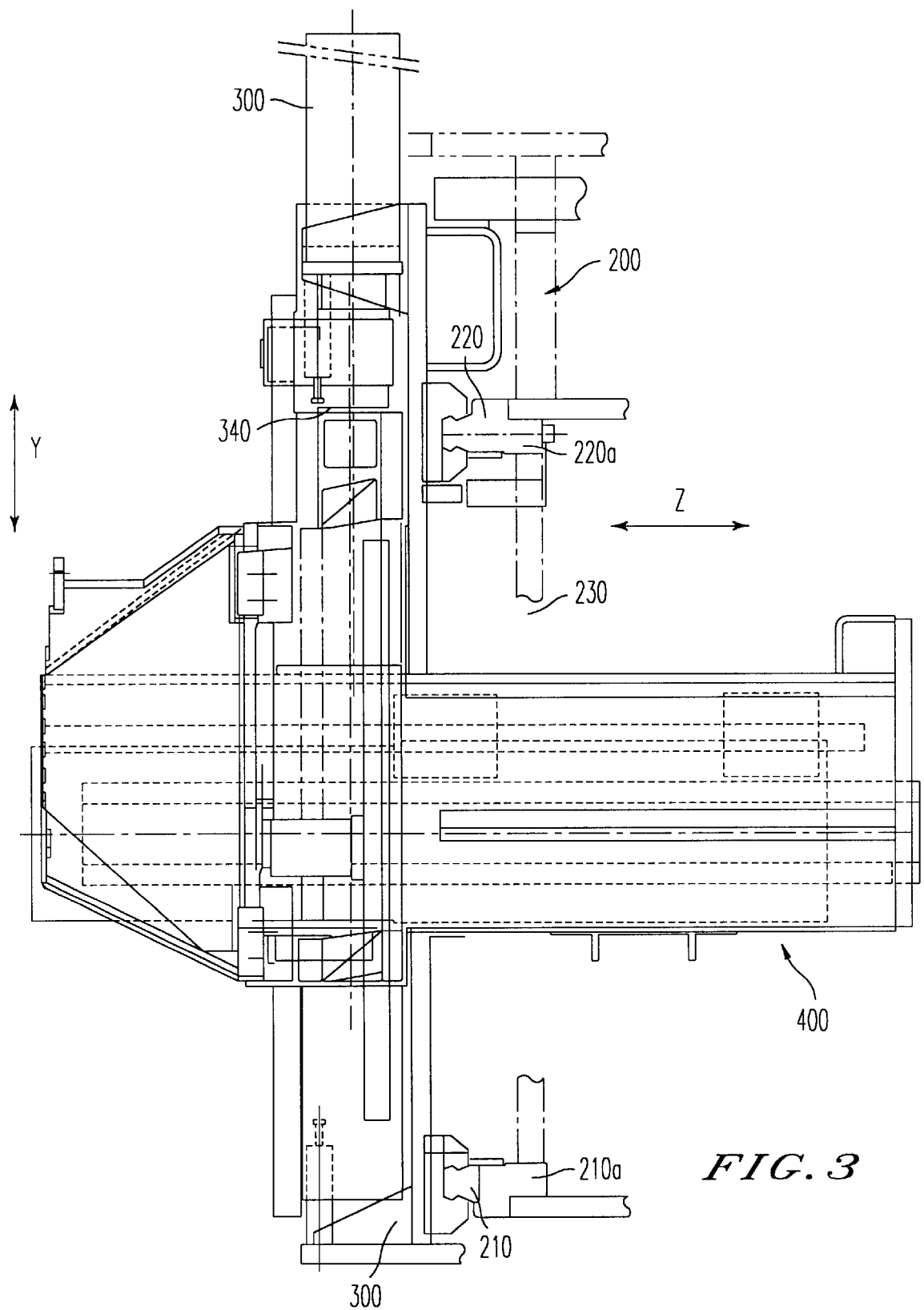
FIG. 3 is a side elevational view of the same drive station.

A particular layout of the invention comprises disposing the headstock 400 in the central openings 230 and 330 of the support chassis or frame 200 and of the vertical table 300 respectively, as shown in FIG. 3, such that the slide 100 can move along the Z axis while straddling the vertical plane P(x,y). Thus, the mobility of the slide 100 of FIG. 2 in the three directions illustrated by the arrows X, Y and Z is employed with maximum proximity of the movable masses (slide 100, headstock 400, vertical table 300) to the vertical plane P(x,y) defined by the two pairs of rails 210, 220 and 310, 320.

Another object of the invention is to make the vertical table 300 and the headstock 400 of aluminum, thus permitting these two movable masses to have lighter weight while retaining sufficient rigidity of the overall movable structure.

Another object of the invention is to ensure mobility of the different reciprocating rectilinear displacements (arrows X, Y and Z) of the movable mechanisms (table 300, headstock 400 and slide 100) by linear motors 500 appropriately disposed (one or two per displacement) to enable the relative movements of the mechanisms under the best conditions.

For example, the table 300 is preferably driven (arrow X) along the transverse rails 210 and 220 by a single linear motor 500 installed at the level of the lower rail 210 in FIG. 3, on the lower transverse member 210a. In fact, since the rails 210 and 220 are integral with the fixed frame 200, one motor can suffice to impose the displacements along the X axis. Preferably the upper rail 220 providing guidance is mounted without positively bearing on the heel of the upper transverse member 220a of the frame 200 to absorb differences between the expansion of the steel of the rail 220 and the aluminum of the table 300.

The headstock 400 for its part is driven (arrow Y) in FIG. 2 along the rails 310 and 320 of the table 300 by two linear motors 500 mounted in diametrically opposite relationship, one on each side of the central opening 330, on the two lateral uprights 320a and 320b of the table 300. To facilitate ascending movements of the headstock 400 along the Y axis, a balancing jack 340 (see FIG. 3) is judiciously wedged in a shoe 350 (see FIG. 2) associated with the upper crossbeam of the table 300, to compensate for the gravitational forces of the movable mass of the headstock, including the slide and spindle.

Furthermore, the slide 100 is driven (arrow Z) along the longitudinal rails 410 and 420 of the headstock 400 by two linear motors 500, which are also disposed diametrically opposite and below the guide rails, in this way balancing the forces of magnetic attraction and the thermal deformations on the central Z axis of the slide 100, on which there are aligned the center of gravity, the resultant of the motor thrust and the resultant of the thrust of the rotating tool at the end of slide 100. In addition, according to a particular arrangement of the invention, the longitudinal guide rails 410 and 420 and the secondary blocks 510 of the linear motors 500 associated with the headstock 400 extend over the entire length thereof, while the slide blocks 120 and the primary blocks 520 of the linear motors 500 associated with the slide 100 extend only over a rear portion 100a thereof. This arrangement is particularly advantageous, because it permits a structure with constant overhang to be achieved, or in other words, by virtue of the arrangement of rails and linear motors, the load is always the same at the level of the rails, unlike the arrangements of the other devices for sliding on rails, which have an overhang that is progressive and proportional to the travel of the slide, that is difficult to digitize and that therefore impacts the quality of machining precision.

Figure 4:
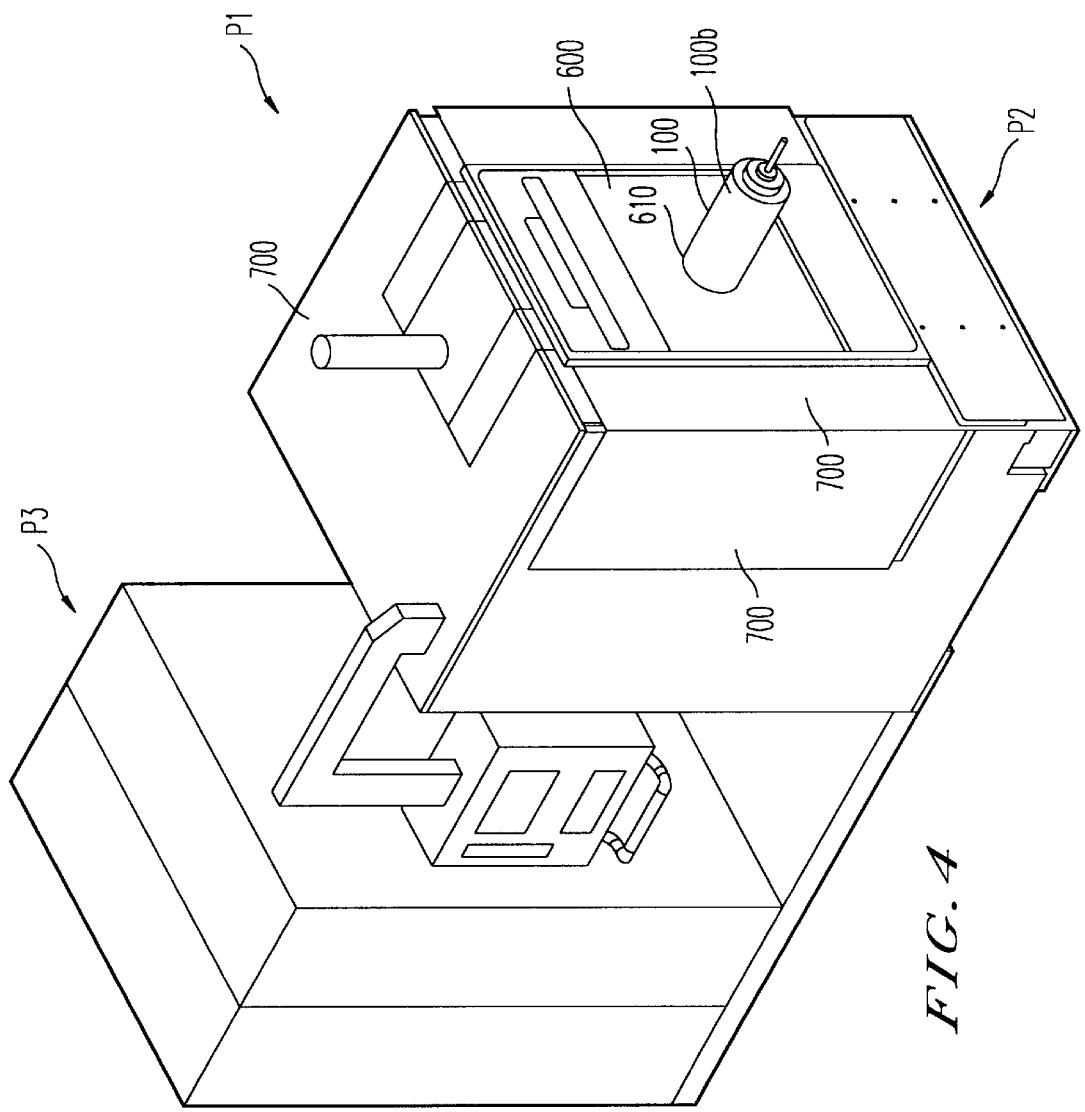
FIG. 4 is a perspective view of such a machine provided with means to limit temperature changes in the logical structure.

As illustrated in FIG. 4, the front portion 100b of the slide 100 is unencumbered by drive mechanisms and passes through a vertical telescopic cowling 600 which follows the movements of the slide 100 and separates the drive station P1 from the machining station P2. The fact that the portion 100b of the slide 100 being displaced in the machining station P2 is unencumbered by guide mechanisms allows the size of the movable mechanism 100 in the station to be reduced, thus ensuring more space for the other elements associated therewith, such as the part to be machined, the part-holder table, and the tool magazine. Because of the absence of drive mechanisms, it can be ensured that chips and cooling or chip-removal fluids do not come into contact with the mechanisms which, in common with the linear motors, are highly sensitive thereto.

According to a particularly advisable choice of the Applicant, the front portion 100b of the slide 100 has a cylindrical shape and passes into a circular orifice 610 provided in the telescopic cowling 600. This arrangement leads to considerable simplification of the sealing device necessary for the joint between the slide 100 and the vertical telescopic cowling 600. Thus, according to a particularly advantageous embodiment of the invention, leaktightness of the sliding joint formed between the slide 100 and the vertical telescopic cowling 600 is ensured by an O-ring (not shown).

The symmetry and vertical nature of the logical structure that is the object of the present invention have the advantage of improving the rigidity of the assembly, again to achieve optimum structural rigidity, which is provided as a set of interconnected plates 700 disposed around the logical structure so as to form a sealed heat-protection enclosure. In fact, temperature changes have adverse consequences for machining precision. Since the requirements and specifications for high-speed machine tools demand precision on the micron scale, it is particularly advisable to create an adiabatic system in order to avoid any expansion or contraction, even minimal, of the materials comprising the logical structure.

According to a preferred embodiment of the invention, the plates 700 forming the heat-protection enclosure are coated on their exterior surface with a white-colored paint in order to reflect the maximum amount of light and to reduce the absorption of quantities of heat by the plates and in this way to limit temperature variations.

Advantageously, to reduce temperature variations related to the internal elements of the structure or to temperature conditions exceeding the insulation capacities of the enclosure, said enclosure is equipped with means (not shown) to supply and remove quantities of heat in order to maintain a constant temperature in the interior thereof.

It is understood that the foregoing description and illustration of the machine are provided for the purposes of disclosure and not of limitation. Clearly, it will be possible to arrange, modify and improve the foregoing example in various ways without going beyond the scope of the invention considered in its broadest aspects and spirit.

Thus, as stated in the introduction of the present document, the plane of machining of the parts may be disposed horizontally, such that the plane P(x,y) of the first two axes X and Y is considered to be horizontal and the plane P(x,z) of the third axis Z is considered to be vertical. In this case, the balancing device will operate on the vertically movable slide.

To permit better understanding of the drawings, a list of reference symbols together with their descriptions is provided hereinbelow.

| | |
|---|---|
| M | Machine tool of the spindle-carrier type |
| P1 | Drive station |
| P2 | Machining station |
| P3 | Control station |
| 100 | Spindle-carrier slide |
| 100a | Rear portion of the spindle-carrier slide |
| 100b | Front portion of the spindle-carner slide |
| 110, 120 | Slide blocks of the spindle-carrier slide |
| 200 | Support chassis or frame |
| 210a, 220a | Transverse members of the frame |
| 210, 220 | Transverse guide rails of the frame |
| 230 | Passage opening in the frame |
| 300 | Vertical table forming support framework |
| 310a, 320a | Lateral uprights of the table |
| 310, 320 | Lateral guide rails of the table |
| 330 | Passage opening into the table |
| 340 | Balancing jack |
| 350 | Shoe for retaining the balancing jack |
| 400 | Headstock |
| 410, 420 | Longitudinal guide rails of the headstock |
| 500 | Linear motors |
| 510 | Secondary blocks of the linear motors |
| 520 | Primary blocks of the linear motors |
| 600 | Telescopic cowling |
| 610 | Circular orifice for passage of the slide |
| 700 | Plates comprising the heat-protection enclosure |
| Arrow X | Movement along the X axis |
| Arrow Y | Movement along the Y axis |
| Arrow Z | Movement along the Z axis |

I claim:

1. A logical structure of a frame of a machine tool enabling displacements of a movable mechanism along three axes X, Y and Z, comprising:

two transverse horizontal guide rails disposed in parallel in a vertical plane P(x,y) and enabling horizontal displacements of the movable mechanism along the X axis, two lateral vertical guide rails disposed in parallel in the same vertical plane P(x,y) and enabling vertical displacements of the movable mechanism along the Y axis, perpendicular to the X axis, two longitudinal horizontal guide rails disposed in parallel in a horizontal plane P(x,y) and enabling horizontal displacements of the movable mechanism along the Z axis, perpendicular to the X and Y axes, wherein the two longitudinal horizontal guide rails are, on the one hand, situated one on each side of the vertical plane P(x,y) defined by the two axes X and Y, such that a center of gravity of the movable mechanism is as close as possible to the vertical plane P(x,y) of the displacements along the X and Y axes and, on the other hand, are mounted to be slidable along the Y axis between the two lateral vertical guide rails which are mounted to be slidable along the X axis between the two transverse horizontal guide rails, wherein different translational movements of the logical structure are ensured by linear motors associated with the pairs of guide rails, and wherein a front portion of the movable mechanism is unencumbered by drive mechanisms and passes through a telescopic cowling which follows movements of the movable mechanism and separates a drive station from a machining station.

2. A machine tool of the spindle-carrier type for high-speed machining in which a drive station uses a logical structure enabling displacements of a spindle-carrier slide along three axes X, Y and Z, comprising:

a fixed frame provided with a support chasses made in a vertical plane P(x,y) from a first pair of parallel transverse horizontal rails enabling a vertical table forming a support framework to slide therebetween in a transverse horizontal movement along the X axis, said vertical table being bordered laterally by a second pair of parallel lateral vertical rails disposed perpendicular to the first pair of parallel transverse horizontal rails in order to enable a headstock to slide therebetween in a vertical movement directed in the Y axis, said logical structure moving inside a heat-protection enclosure provided to supply and remove quantities of heat in order to maintain a constant temperature in an interior thereof, wherein the headstock is bordered laterally by a third pair of parallel longitudinal horizontal rails disposed one on each side of the vertical plane P(x,y) perpendicular to the first pair of parallel transverse horizontal rails and to the second pair of parallel lateral vertical rails in order to enable the spindle-carrier slide to slide therebetween while straddling the plane P(x,y) in a horizontal movement directed in the Z axis, wherein the slide is driven along the third pair of parallel longitudinal horizontal rails of the headstock by two linear motors disposed diametrically opposite and below the third pair of parallel longitudinal guide rails on which the slide is kept suspended, and wherein a front portion of the slide is unencumbered by drive mechanisms and passes through a telescopic cowling which follows movements of the slide and separates the drive station from a machining station.

3. A machine tool according to claim 2, wherein the support chassis includes two transverse members which, being designed to support the first pair of parallel transverse horizontal rails for guiding the table along the X axis, define between them an opening for passage of the headstock through the support chassis, and wherein the table includes two lateral uprights which, being designed to support the second pair of parallel lateral vertical rails for guiding the headstock along the Y axis, define between them an opening for passage of the headstock through the table.

4. A machine tool according to claim 2, wherein a balance jack is wedged in a shoe associated with an upper crossbeam of the table to compensate for gravitational forces of a movable mass of the headstock including the slide and the spindle.

5. A machine tool according to claim 2, wherein mobility of different reciprocating rectilinear displacements of the table, of the headstock and of the slide is ensured by two linear motors for each of the displacements.

6. A machine tool according to claim 2, wherein the table is driven along the first pair of parallel transverse horizontal rails by a single linear motor installed at a level of a lower member carrying a lower rail of said first pair, an upper rail of said first pair providing guidance and being mounted without positively bearing on a heel of an upper transverse member of the support chassis.

7. A machine tool according to claim 5, wherein the headstock is driven along the second pair of parallel lateral vertical rails of the table by two linear motors mounted in diametrically opposite relationship, one on each side of a central opening, on two lateral uprights of the table, and wherein the third pair of parallel longitudinal rails and secondary blocks of the two linear motors of the headstock extend over an entire length of the headstock, while slide blocks sliding along the third pair of rails and primary blocks of the same two linear motors are associated with the slide over a rear portion thereof.

8. A machine tool according to claim 2, wherein the front portion of the slide has a cylindrical shape and passes into a circular orifice provided in the telescopic cowling.

9. A machine tool according to claim 8, wherein leak-tightness of a sliding joint formed between the slide and the telescopic cowling is ensured.

* * * * *